United States Patent [19]
Okada et al.

[11] Patent Number: 5,146,479
[45] Date of Patent: Sep. 8, 1992

[54] UP/DOWN COUNTER FOR COUNTING BINARY DATA STORED IN FLIP FLOPS

[75] Inventors: Keisuke Okada; Masatoshi Kimura, both of Hyogo, Japan

[73] Assignee: Mitsubishi Denki Kabushiki Kaisha, Tokyo, Japan

[21] Appl. No.: 709,580

[22] Filed: Jun. 5, 1991

[30] Foreign Application Priority Data

Jun. 5, 1990 [JP] Japan .................................. 2-148128
May 30, 1991 [JP] Japan .................................. 3-127425

[51] Int. Cl.$^5$ .......................................... H03K 23/66
[52] U.S. Cl. ...................................... 377/41; 377/45; 377/26
[58] Field of Search ............................ 377/41, 45, 26

[56] References Cited
U.S. PATENT DOCUMENTS

| | | | |
|---|---|---|---|
| 2,848,166 | 8/1958 | Wagner | 377/41 |
| 3,906,195 | 9/1975 | Maejima | 377/41 |
| 4,700,370 | 10/1987 | Banerjee et al. | 377/41 |
| 4,713,832 | 12/1987 | Hutson | 377/45 |

OTHER PUBLICATIONS

AT&T Bell Laboratories "Principles of CMOS VLSI Design" (1985), p. 338.

*Primary Examiner*—Stanley D. Miller
*Assistant Examiner*—Scott A. Ouellette
*Attorney, Agent, or Firm*—Lowe, Price, LeBlanc & Becker

[57] ABSTRACT

An updown counter up-counts binary data stored in respective flip-flops in an up-count mode, and down-counts the binary data stored in the respective flip-flops in a down-count mode. When a command for an up-count mode is applied by an up/down control signal, the binary data stored in the respective flip-flops is converted into a complement on two after converting it into a complement on one. When a command for a down-count mode is applied by an up/down control signal, the binary data stored in the respective flip-flops is converted into a complement on one after converting it into a complement on two. The converted data is used to rewrite the data stored in the respective flip-flops.

25 Claims, 8 Drawing Sheets

UP/DOWN COUNTER FOR COUNTING BINARY DATA STORED IN FLIP FLOPS

CROSS-REFERENCE TO RELATED APPLICATIONS

This application is related to copending application Ser. No. 07/707,145 filed May 31, 1991 entitled a Binary Data Converter, commonly assigned with the present invention.

BACKGROUND OF THE INVENTION

1. Field of Invention

The present invention relates to a binary counter and, more specifically, to a counter for counting up, counting down or for counting up and down binary data.

FIG. 8 is a block diagram illustrating structures of a conventional updown counter which is disclosed in "Principles of CMOS VLSI Design" 1985 by AT&T Bell Laboratories, p. 338. An example shown in FIG. 8 is the updown counter of 3 bits. In the Figure, this updown counter comprises selectors 1b and 1c, adders 2a-2c and flip-flops 3a-3c. Each of the selectors 1b and 1c has one input terminal A connected to a power source. The other input terminal B of each of the selectors 1b and 1c is connected to the ground. The selectors 1b and 1c are responsive to up/down control signals inputted to selector control terminals S to selectively output the inputs applied to the input terminals A or the inputs applied to the input terminals B from the output terminals Y, respectively. Thus, when a command for a down-count mode is applied by the up/down control signals to the selectors 1b and 1c, they select and output the inputs applied to the input terminals A, and when the command for an up-count mode is applied, the inputs applied to the input terminals B are selected and outputted. One input terminal A of each of the adders 2a-2c receives outputs from Q output terminals of the flip-flops 3a-3c, respectively. The other terminal B of each of the adders 2b and 2c receives the outputs from the selectors 1b and 1c. The input terminal B of the adder 2a is fixedly connected to the power source. The adders 2a-2c add values inputted to the input terminals A with values inputted to the input terminals B, and output the resultant sum from sum signal output terminals S, respectively. When a carry is generated as a result of the addition, the adders 2a-2c output carry signals from carry output terminals CO, respectively. The carry signals outputted from the adders 2a and 2b are applied to carry input terminals Ci of the adders 2b and 2c at a next stage in a more significant bit side. A carry input terminal of the adder 2a for a least significant bit is grounded. The sum signal output terminals S of the adders 2a-2c are connected to data input terminals D of the flip-flops 3a-3c, respectively. The flip-flops 3a-3c are responsive to rising edges (or falling edges) of clock signals applied to clock terminals CK to capture the signals applied to the data input terminals D and store the same. The stored data in the flip-flops 3c are outputted from Q output terminals and are applied to output terminals 4a-4c, respectively. Outputs from these output terminals 4a-4c form an output from the updown counter.

Operations of the updown counter thus constructed and shown in FIG. 8 will be described below. When the up-count mode is commanded by the up/down control signal, the selectors 1b and 1c select the input through the input terminals B for outputting them, so that a binary data "001" (=+1) is inputted to each of the flip-flops 2a-2c. Therefore, the updown counter in this case functions as the up-counter which adds one to the data stored in the flip-flops 3a and 3d. On the other hand, when the down-count mode is commanded by the up/down control signal, the selectors 1b and 1c select the input terminals A for outputting, so that the binary data "111" is inputted to the flip-flops 2a-2c. If the binary data "111" is a binary data of 3 bits represented by the complement on two, it represents minus one (−1). Therefore, the addition of "111" to the original binary data stored in the flip-flops 3a-3c is equal to addition of minus one, i.e., subtraction of one. In this case, the updown counter functions as the down-counter.

If the adders 2a-2c in FIG. 8 have well known Manchester structures as shown in FIG. 9, each adder requires 24 transistors. The selectors 1b and 1c each can be formed by four transistors, and the flip-flops 3a-3c each can be formed by 16 transistors. Therefore, the conventional updown counter shown in FIG. 8 requires 44 transistors per one stage. Thus, the conventional updown counter shown in FIG. 8 requires many transistors, which unpreferably increases a circuit area and a cost.

The above described problem occurs not only in such updown counters as shown in FIG. 8 but also in general binary counters (up counter, down counter and updown counter) counting binary data.

SUMMARY OF THE INVENTION

Accordingly, it is an object of the invention to provide a binary counter having simple circuit structure.

A binary counter according to the invention comprises memory means, up-count means, down-count means and control means. The memory means stores binary data to be counted. The up-count means up-counts the binary data stored in the memory means by converting the same into a complement on two after converting the same to a complement on one. The down-count means down-counts the binary data stored in the memory means by converting the same into a complement on one after converting the same to a complement on two. The control means activates the up-count means in an up-count mode and activates the down count means in a down-count mode. The data stored in the memory means is rewritten, depending on a result of counting of the up-count means or the down-count means activated by the control means.

A binary counter in accordance with another aspect of the present invention comprises memory means for storing binary data to be counted up, 1's complement converting means for converting the binary data stored in the memory means to 1's complement, and 2's complement converting means for converting output from the 1's complement converting means to 2's complement. The stored data in the memory means is rewritten by the output from the 2's complement converting means.

A binary counter in accordance with a further aspect of the present invention comprises memory means for storing binary data to be counted down, 2's complement converting means for converting the binary data stored in the memory means to 2's complement, and 1's complement converting means for converting output from the 2's complement converting means to 1's complement. The stored data in the memory means is rewritten by the output from the 1's complement converting means.

If the binary data is converted to the complement on two after it is converted to the complement on one, the converted binary data will be equal to a value resulting from addition of 1 to the original binary data. On the other hand, if the binary data is converted to the complement on one after it is converted to the complement on two, the converted binary data will be equal to a value resulting from subtraction of 1 from the original binary data. The present invention is intended to construct the binary counter by utilizing these mathematical characteristics. Thus, in the up-count mode, the up-count means up-counts the binary data stored in the memory means by converting the same into the complement on two after converting the same to the complement on one. On the other hand, in the down-count mode, the down-count means down-counts the binary data stored in the memory means by converting the same into the complement on one after converting the same to the complement on two. These conversions to the complement on one and complement on two can be effected by a simple gate circuit, so that the entire structure can be simple, resulting in reduction of a circuit area and an inexpensive binary counter.

When up counting or down counting only is to be done, up counting or down counting of binary data is carried out in accordance with the same principle as described above. The 1's complement converting means and 2's complement converting means constituting the binary counter carrying out up counting or down counting only can be implemented by a simple gate circuit, so that the circuit structure can be simplified, reducing cost.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
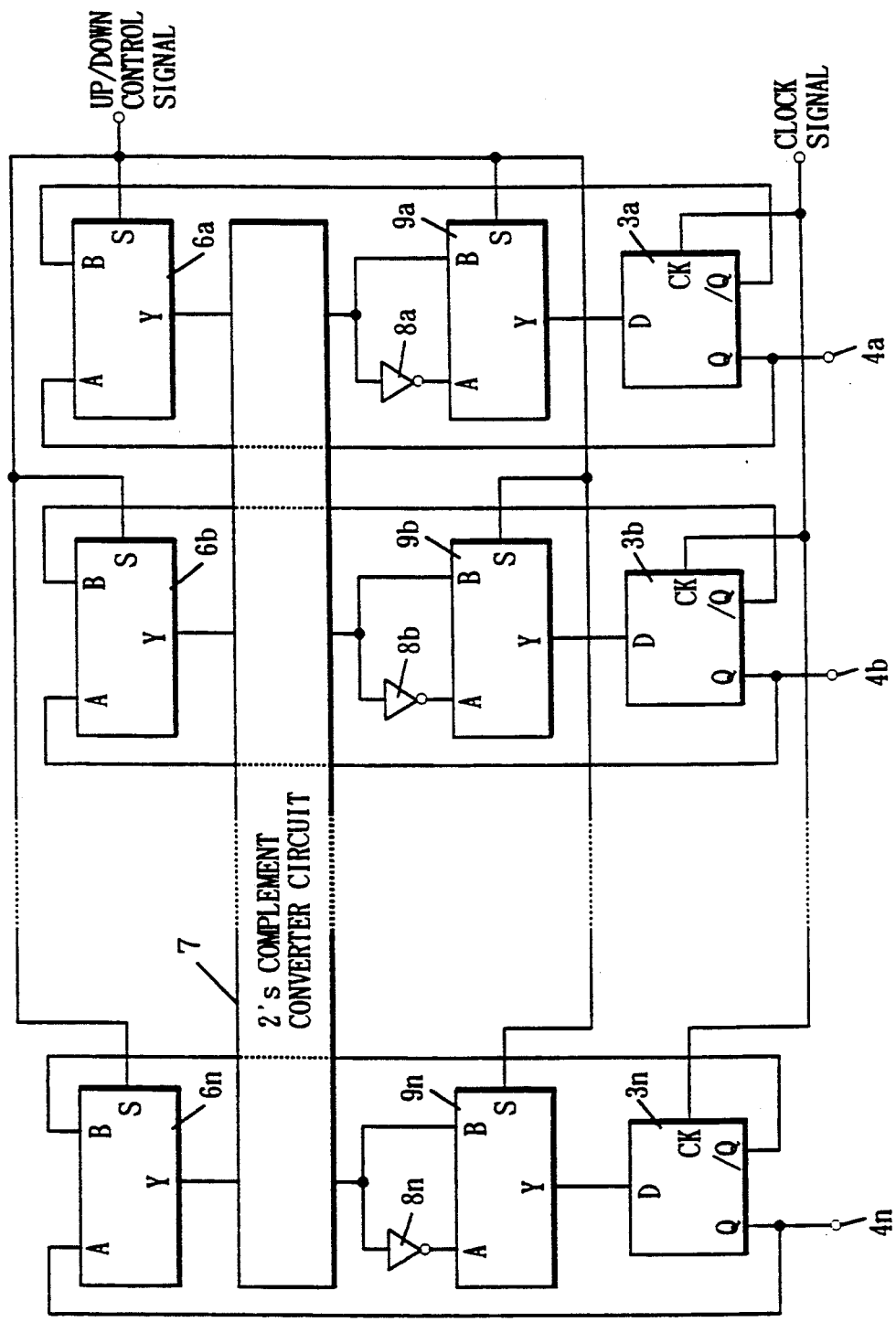
FIG. 1 is a logic circuit diagram illustrating structures of an embodiment of this invention.

FIG. 1 is a logic circuit diagram illustrating a structure of an embodiment of this invention. The structure of an updown counter of n bits is illustrated in FIG. 1. In the figure, data stored in flip-flops $3a-3n$ is outputted from respective Q output terminals thereof. An inverted data of the stored data is outputted from /Q output terminals of the respective flip-flops $3a-3n$. The outputs from the Q output terminals of the flip-flops $3a-3n$ are applied to output terminals $4a-4n$, respectively, and are also applied to one input terminal A of each of the selectors $6a-6n$. The outputs from the /Q output terminals of the flip-flops $3a-3n$ are applied to the other input terminal B of each of the selectors $6a-6n$. When the respective selectors $6a-6n$ receive commands for a down-count mode by means of the up/down control signals applied to the selector control terminals S thereof, they select the signals applied to the input terminals A, and when they receive the commands for an up-count mode, they select the inputs applied to the input terminals B to output the same from the output terminals Y. Outputs from the selectors $6a-6n$ are applied to the 2's complement converter circuit 7. The 2's complement converter circuit 7 performs the 2's complement conversion of the applied binary data. In the 2's complement conversion, all bits of the applied binary data are inverted, and then one is added thereto. Respective bit signals of the binary data outputted from the 2's complement converter circuit 7 are applied through corresponding inverters $8a-8n$ to the input terminals A of the selectors $9a-9n$, and are also applied directly to the input terminals B of the selectors $9a-9n$, respectively. Similarly to the selectors $6a-6n$, the respective selectors $9a-9n$ select the signals applied to the input terminals A when they receive commands for the down-count mode by means of the up/down control signals applied to the selector control terminals S thereof to output the signals from the output terminals Y, and when they receive the commands for the up-count mode, they select the inputs applied to the input terminals B and output the same from the output terminals Y. Outputs from the selectors $9a-9n$ are applied to data input terminals D of the flip-flops $3a-3n$, respectively. The flip-flops $3a-3n$ are D-type flip-flops, and are synchronized with rising edges (or falling edges) of clock signals applied to clock terminals CK to capture the signals applied to the data input terminals D and store the same.

In the updown counter thus constructed and shown in FIG. 1, the binary data outputted from the /Q output terminals of the flip-flops $3a-3n$ is an inverted data of the data stored in the flip-flops $3a-3n$, and thus is the data resulted from 1's complement conversion of the stored data in question. Further, the inverters $8a-8n$ function as means for converting the binary data outputted from the 2's complement converter circuit 7 into the complement on one. The output from the updown counter is introduced from the output terminals $4a-4n$.

Figure 2:
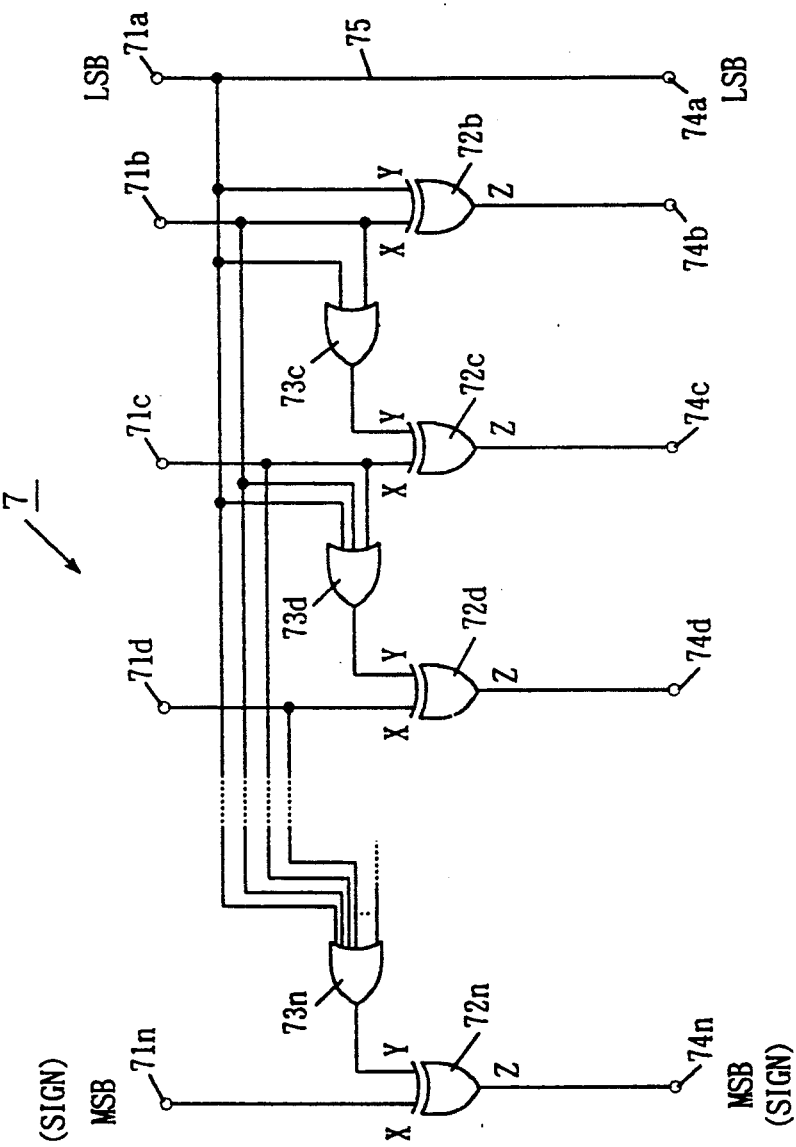
FIG. 2 is a logic circuit diagram illustrating a structural example of 2's complement converter circuit shown in FIG. 1.

FIG. 2 is a logic circuit diagram illustrating a structural example of 2's complement converter circuit shown in FIG. 1. In the Figure, the input terminals $71a-71n$ receive in parallel binary data of n bits from output terminals Y of the selectors $6a-6n$. A bit signal applied to the input terminal $71a$ is a least significant bit signal of the above binary data, and a bit signal applied to the input terminal $71n$ is a most significant bit signal (i.e., sign bit). The least significant bit signal inputted through the input terminal 71a is applied directly to an output terminal 74a through a signal line 75. Respective bit signals inputted through the input terminals 71b–71n are applied to one input X of each of exclusive OR circuits 72a–72n. The least significant bit signal inputted through the input terminal 71a is applied to the other input Y of the exclusive OR circuit 72b. The inputs Y of the other exclusive OR circuits 72c–72n receive outputs from corresponding OR gates 73c–73n, respectively. The OR gates 73c–73n receive bit signals less significant than the corresponding bit signals, respectively. With respect to, e.g., the OR gate 73d, it receives the bit signals less significant than the corresponding bit signal, i.e., the bit signal from the input terminal 71d, in other words, it receives the bit signals from the input terminals 71a–71c. Outputs Z of the exclusive OR circuits 72b–72n are connected to the output terminals 74b–74n, respectively. The exclusive OR circuits 72b–72n form an example of selecting means for selectively outputting inverted signals or non-inverted signals of bit signals applied to the inputs X, depending on the logic of the signals applied to the inputs Y.

Figure 3:
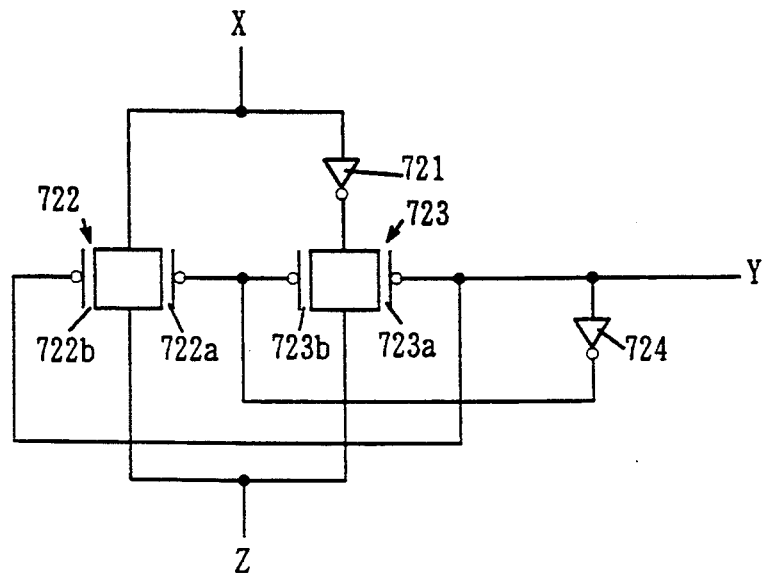
FIG. 3 is a circuit diagram illustrating a structural example of an exclusive OR circuit shown in FIG. 2.

FIG. 3 is a circuit diagram illustrating structures of any one of the exclusive OR circuits 72b–72n shown in FIG. 2. In the figure, the bit signal applied to one input X is outputted to the output Z through a transmission gate 722 comprises. The bit signal applied to the input X is also outputted to the output Z through an inverter 721 and a transmission gate 723. The transmission gate 722 comprises a N-channel MOS transistor 722a and a P-channel MOS transistor 722b connected in parallel. Similarly, the transmission gate 723 comprises a N-channel MOS transistor 723a and a P-channel MOS transistor 723b connected in parallel. The signal applied to the other input Y is applied directly to gates of the P-channel MOS transistor 722b and N-channel MOS transistor 723a. The signal applied to the other input Y is inverted by the inverter 724 and then is applied to the N-channel MOS transistor 722a and the P-channel MOS transistor 723b. Therefore, the transmission gates 722 and 723 are complementarily turned on and turned off, depending on the signal applied to the input Y.

An operation principle of the embodiment shown in FIG. 1 will be described below.

The 1's complement conversion is inversion of every bit of the binary data of n bits. The 2's complement conversion is to invert every bit of the binary data of n bits and add one thereto. In the arithmetical processing, using the binary data represented by the complement on two, the most significant bit of the binary data is treated as the sign bit which indicates whether the binary data is positive or negative. That is; if the sign bit is "0", it indicates that the value of the data is positive, and if the sign bit is "1", it indicates that the value of the data is negative.

As an example, it is assumed that 4 bits of binary data "0101" ($= +5$) is up-counted and down-counted.

(1) Up-Counting

The binary data "1010" is resulted from the 1's complement conversion of the above binary data "0101" ($= +5$). This binary data "1010" represents "$-6$", if it is regarded as a binary data represented by the complement on two. If this binary data "1010" is further processed by the 2's complement conversion, the converted binary data will be "0110" ($= +6$). As described above, if the original binary data "0101" ($= +5$) is processed by the 2's complement conversion after the 1's complement conversion, the converted binary data "0110" ($= +6$) will be equal to a sum of the original binary data and one. This can be described as below. Assuming that the original binary data has a value of A, the binary data after the 1's complement conversion has a value of ($-A-1$). Further, when the binary data after the 1's complement conversion is processed by the 2's complement conversion, the converted binary data will be $-(-A-1) = A+1$. Therefore, the application of the 2's complement conversion on a given binary data after the 1's complement conversion has the same effect as up-counting.

(2) Down-Counting

The binary data "1011" ($= -5$) is resulted from the 2's complement conversion of the original binary data "0101" ($= +5$). Further, the binary data "0100" ($= +4$) is resulted from the 1's complement conversion of the above converted binary data "1011" ($=-5$). As described above, if the original binary data "0101" ($= +5$) is processed by the 1's complement conversion after the 2's complement conversion, the converted binary data "0100" ($= +4$) will be equal to a result of subtraction of one from the original binary data. This can be described as below. Assuming that the original binary data has a value of A, the binary data after the 2's complement conversion has a value of $-A$. Further, when the binary data after the 2's complement conversion is processed by the 1's complement conversion, the converted binary data will be $-(-A)-1 = A-1$. Therefore, the application of the 1's complement conversion on a given binary data after the 2's complement conversion has a same effect as down-counting.

The embodiment shown in FIG. 1 performs the up-counting and down-counting in accordance with the principle stated above, and operations thereof will be described below.

When the up-count mode is commanded by means of the up/down control signal, the respective selectors 6a–6n and 9a–9n select the signals applied to the input terminals B and output them from the output terminals Y. Therefore, the respective selectors 6a–6n select the binary data outputted from the /Q output terminals of the respective flip-flops 3a–3n and apply the same to the 2's complement converter circuit 7. The binary data outputted from the respective /Q output terminals is the inverted data of the data stored in the flip-flops 3a–3n, that is, the data after the 1's complement conversion. The 2's complement converter circuit 7 performs the 2's complement conversion of the binary data applied from the respective selectors 6a–6n, i.e., the data after the 1's complement conversion. In this operation, the respective selectors 9a–9n have selected the signals applied to the input terminals B, so that the binary data outputted from the 2's complement converter circuit 7 is applied through the respective selectors 9a–9n to the input terminals D of the flip-flops 3a–3n. The flip-flops 3a–3n capture the binary data inputted from the selectors 9a–9n and store them at the rising edges (or falling edges) of clock signals applied to clock terminals CK. Therefore, the binary data which has been stored in the flip-flops 3a–3n are rewritten, and the rewritten binary data is outputted from the output terminals 4a–4n. As described above, in this up-count mode, the binary data stored in the flip-flops 3a–3n is processed in such a manner that the 2's complement conversion is applied thereto after the 1's complement conversion. Therefore, the converted binary data is a sum of the original data and one, as described before. Consequently, the updown counter shown in FIG. 1 operates as the up-counter in the above operation.

When the down-count mode is commanded by means of the up/down control signal, the respective selectors 6a-6n and 9a-9n select the signals applied to the input terminals A and output them from the output terminals Y. Therefore, the respective selectors 6a-6n select the binary data stored and outputted from the Q output terminals of the respective flip-flops 3a-3n, and apply the same to the 2's complement converter circuit 7. The 2's complement converter circuit 7 performs the 2's complement conversion of the binary data applied from the respective selectors 6a-6n, and outputs the same. In this operation, the respective selectors 9a-9n have selected the signals applied to the input terminals A. Therefore, the binary data outputted from the 2's complement converter circuit 7 is applied through the respective selectors 9a-9n to the input terminals D of the flip-flops 3a-3n, after it is inverted by the inverters 8a-8n, i.e., after the 1's complement conversion is applied thereto. The flip-flops 3a-3n are responsive to the rising edges (or falling edges) of clock signals applied to clock terminals CK to capture the binary data inputted from the data input terminals D and store the same. As described above, in this down-count mode, the binary data stored in the flip-flops 3a-3n is processed in such a manner that the 1's complement conversion is applied thereto after the 2's complement conversion. The data which has been stored in the flip-flops 3a-3n are rewritten by this converted data, and the rewritten binary data is outputted from the output terminals 4a-4n. As described above, if the binary data is converted to the complement on one after converting it to the complement on two, the converted binary data will be equal to a result of subtraction of 1 from the original binary data. Consequently, the updown counter shown in FIG. 1 operates as the down-counter in the above operation.

An operation principle of the embodiment shown in FIGS. 1, 2 and 3 will be described below. It is assumed that the binary data A (=aN,..a1) of N bits is to be converted into a binary data B (=bN,...b1) of N bits. In this case, there is a following logical relationship between respective bits a1-aN of the binary data A before conversion and respective bits b1-bN of the binary data B after conversion.

$$b1 = a1$$
$$\text{if } a1 = 0, b2 = \underline{a2}$$
$$\text{if } a1 = 1, b2 = a2$$
$$\text{if } a1 + a2 = 0, b3 = \underline{a3}$$
$$\text{if } a1 + a2 = 1, b3 = a3$$
$$\text{if } a1 + a2 + a3 = 0, b4 = \underline{a4}$$
$$\text{if } a1 + a2 + a3 = 1, b4 = a4$$
$$\vdots$$
$$\text{if } a1 + a2 + \ldots aN - 1 + aN = 0, bN = \underline{aN}$$
$$\text{if } a1 + a2 + \ldots aN - 1 + aN = 1, bN = aN$$

Thus, the least significant bit a1 of the binary data A consisting of N bits directly becomes the least significant bit b1 of the converted binary data B. With respect to the bits other than the least significant bit, the respective output bits b2-bN become inversion or non-inversion of the corresponding input bits a2-aN. The selection of these inversion and non-inversion is determined depending on the logical state of the input bits less significant than the input bit in question. Thus, when any input bit among those less significant than the input bit in question is "1", the output bit is the inverted signal of the input bit.

The 2's complement converter circuit 7 shown in FIGS. 1 and 2 is constructed so as to achieve the logical relationship stated above. Each of the OR gates 73c-73n determines whether any input bit signal among those less significant than the corresponding input bit signal is "1". The selection of the inversion and non-inversion of the input bit signal is effected by each of the exclusive OR circuits 72b-72n. When all of the bit signals less significant than the corresponding input bit signal are "0", the logical sum thereof becomes "0" and the signal of "0", i.e., at a "L" level, is applied to the input Y of the exclusive OR circuit. In this case, the transmission gate 722 is therefore turned on and the transmission gate 723 is turned off. As a result thereof, the input bit signal applied to the input X of the exclusive OR circuit is outputted as it is from the output Z through the transmission gate 722. On the other hand, if any input bit signal among those less significant than the corresponding input bit signal is "1", the logical sum thereof becomes "1", so that the signal of "1" i.e., at a "H" level is applied to the second input Y of the corresponding exclusive OR circuit. In this case, the transmission gate 723 is turned on and the transmission gate 722 is turned off. As a result thereof, the input bit signal applied to the input X of the exclusive OR circuit is outputted from the output Z through the transmission gate 723 after being inverted by the inverter 721.

Now, the operations of 2's complement converter circuit 7 shown in FIGS. 1 and 2 will be further described in accordance with a more specific example. It is assumed that a binary data of 4 bits "1011" (=−5) is to be converted into the positive binary data represented by the complement on two. In this case, the least significant bit signal in the binary data "1011" inputted to the input terminals 71a-71d is outputted through the signal line 75 from the output terminal 74a without being inverted. With respect to other bits, since there is "1" among the less significant input bit signal(s) (in this case, the least significant bit signal), all of the bit signals are outputted after inversion. Thus, the output terminals 74a-74d output the binary data "0101" (=+5) represented by the complement on two.

Figure 8:
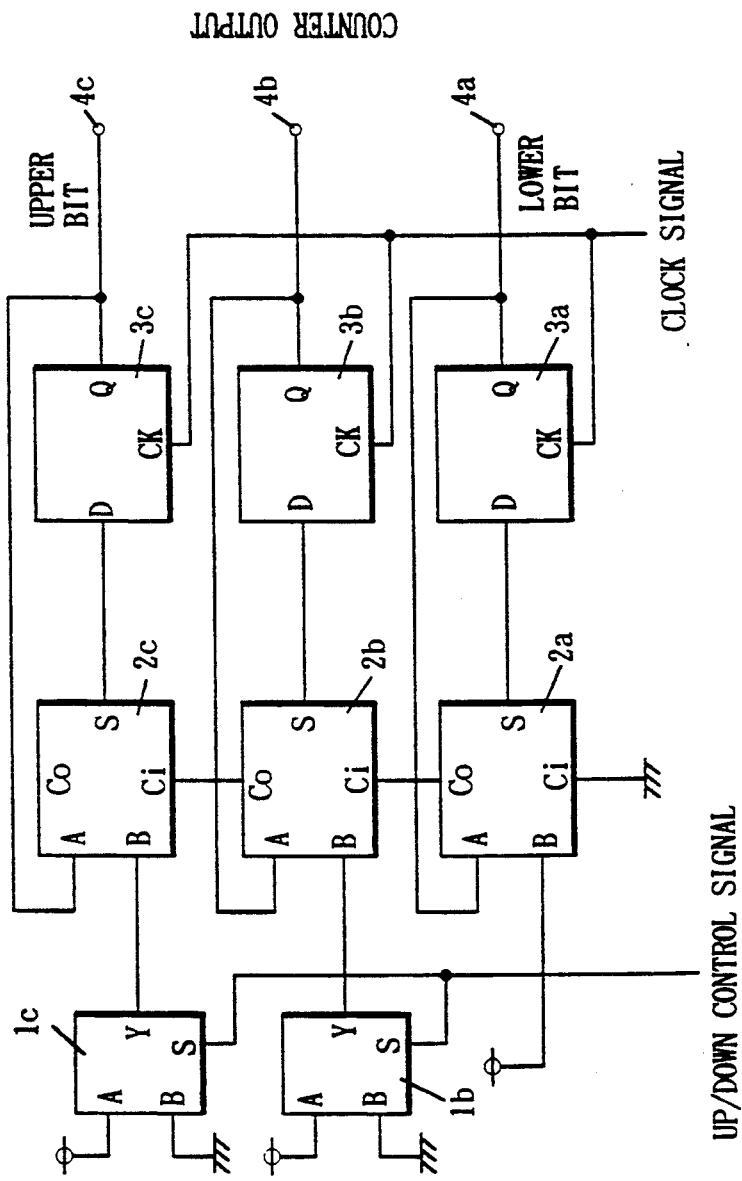
FIG. 8 is a block diagram illustrating a conventional updown counter.
Figure 9:
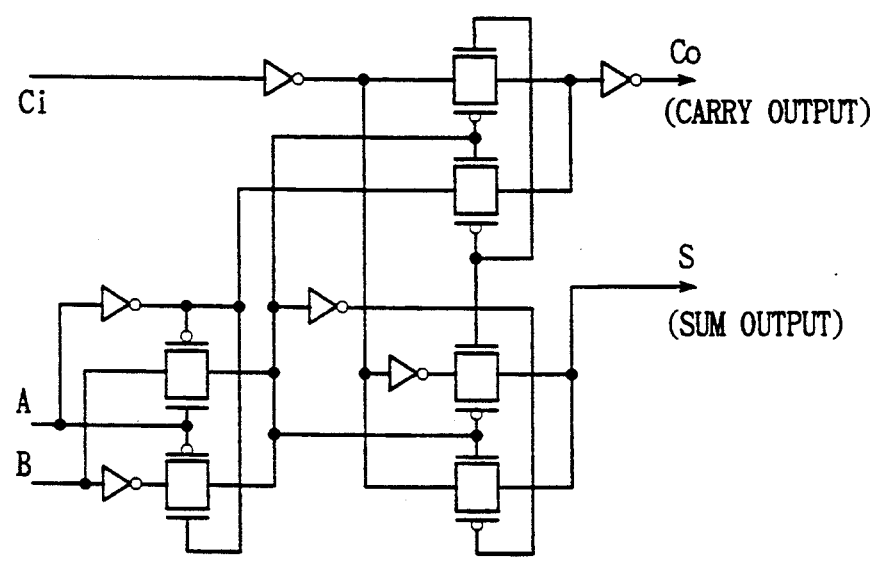
FIG. 9 is a circuit diagram illustrating a counter in FIG. 8 in greater detail.

In the embodiments described above, the up-counting and down-counting of a binary data can be achieved by a combination of 1's complement conversion and a 2's complement conversion. The 1's complement conversion can be achieved by a very simple circuitry such as inverters shown in FIG. 1, and the 2, complement conversion can be achieved by a very simple logical circuit, e.g., as shown in FIG. 2. Therefore, the updown counter of the embodiment has more simplified structure, as compared with the conventional structure shown in FIG. 8, and thus the circuit area and the cost can be reduced. If the 2's complement circuit 7 employs the structures shown in FIGS. 2 and 3, the updown counter shown in FIG. 1 requires only 40 transistors per one stage.

Figure 4:
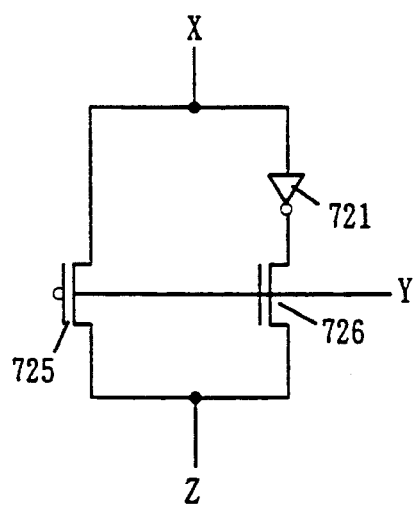
FIG. 4 is a circuit diagram illustrating another structural example of an exclusive OR circuit shown in FIG. 2.

FIG. 4 illustrates another structural example applied for the respective exclusive OR circuits 72b-72n. As shown therein, the structure in FIG. 4 forms an exclusive OR circuit which can be formed by one inverter 721, one P-channel MOS transistor 725 and one N-channel MOS transistor 726. Therefore, the required element number can be further reduced, as compared with the embodiment employing the exclusive OR circuits shown in FIG. 3. However, the transmission gates 722 and 723 shown in FIG. 3 can function even if there is a fault in either of the two MOS transistors included in each gate, so that a reliability in the circuit operation is improved, while the exclusive OR circuit shown in FIG. 4 has not such benefit.

Although data of the result of counting are taken from Q output terminals of the flipflops 3a to 3n in the embodiment shown in FIG. 1, the data of the result of counting may be taken from respective output terminals Y of the selectors 9a to 9n.

Figure 5:
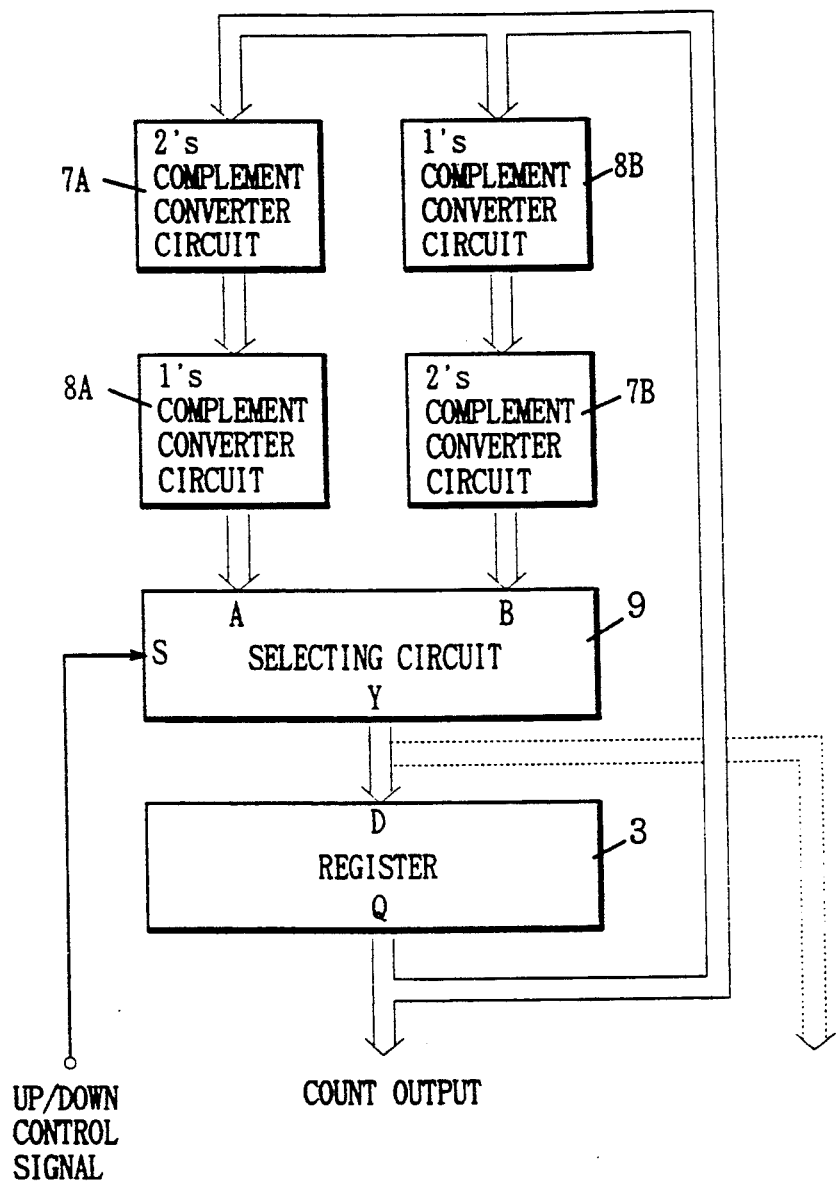
FIG. 5 is a block diagram showing a structure of an updown counter in accordance with another embodiment of the present invention.

FIG. 5 is a block counter showing a structure of an updown counter in accordance with another embodiment of the present invention. Referring to the figure, the updown counter comprises a register 3, 2's complement converting circuits 7A and 7B, 1's complement converting circuits 8a and 8b, and a selector 9. The register 3 includes flipflops 3a to 3n such as shown in FIG. 1, for example, to store binary data to be counted. Outputs of the register 3 (including plurality of bits) are applied to the 2's complement converting circuit 7A and 1's complement converting circuit 8B. An output from the 2's complement converting circuit 7A is applied to the 1's complement converting circuit 8A, and an output from the 1's complement converting circuit 8B is applied to the 2's complement converting circuit 7B. The 2's complement converting circuits 7A and 7B are structured as, for example, shown in FIG. 2. The 1's complement converting circuits 8A and 8B are formed of, as shown in FIG. 1, inverters 8a to 8n provided for each bit, for example. The selected circuit 9 includes selectors 9a to 9n provided for each bit, such as shown in FIG. 1. An output from the 1's complement converting circuit 8A is applied to one input terminal A of each selector, and an output form the 2's complement converting circuit 7B is applied to the other input terminal B of each selector. An up/down control signal is applied to a switch control terminal S of each selector constituting the selecting circuit 9. In response to the up/down control signal, the selecting circuit 9 selects one of the inputs to the input terminals A and B to output the same from the output terminal Y. The output from the selecting circuit 9 is applied to the register 3.

The operation of the embodiment shown in FIG. 5 will be described. When an up count mode is selected by the up/down control signal, the selecting circuit 9 selects binary data input to the input terminal B, and outputs the same from the output terminal Y to the register 3. Therefore, the binary data output from the register 3 is converted in 1's complement converting circuit 8B to 1's complement, and then converted in the 2's complement converting circuit 7B to 2's complement, and then written again in the resistor 3 through the selecting circuit 9. Consequently, the binary data stored in the register 3 is incremented by 1 (+1). When a down count mode is selected by the up/down control signal, the selecting circuit 9 selects binary data input from the input terminal A and outputs the same from the output terminal Y. Therefore, the binary data output from the register 3 is converted in the 2's complement converting circuit 7A to 2's complement, then converted into 1's complement in the 1's complement converting circuit 8A, and then it is rewritten in the register 3 through the selecting circuit 9. Therefore, the binary data stored in the register 3 is declemented by 1 (−1). The data of the result of counting may be provided from the output from the register 3 or from the output from the selecting circuit 9, as represented by a dotted line.

Figure 6:
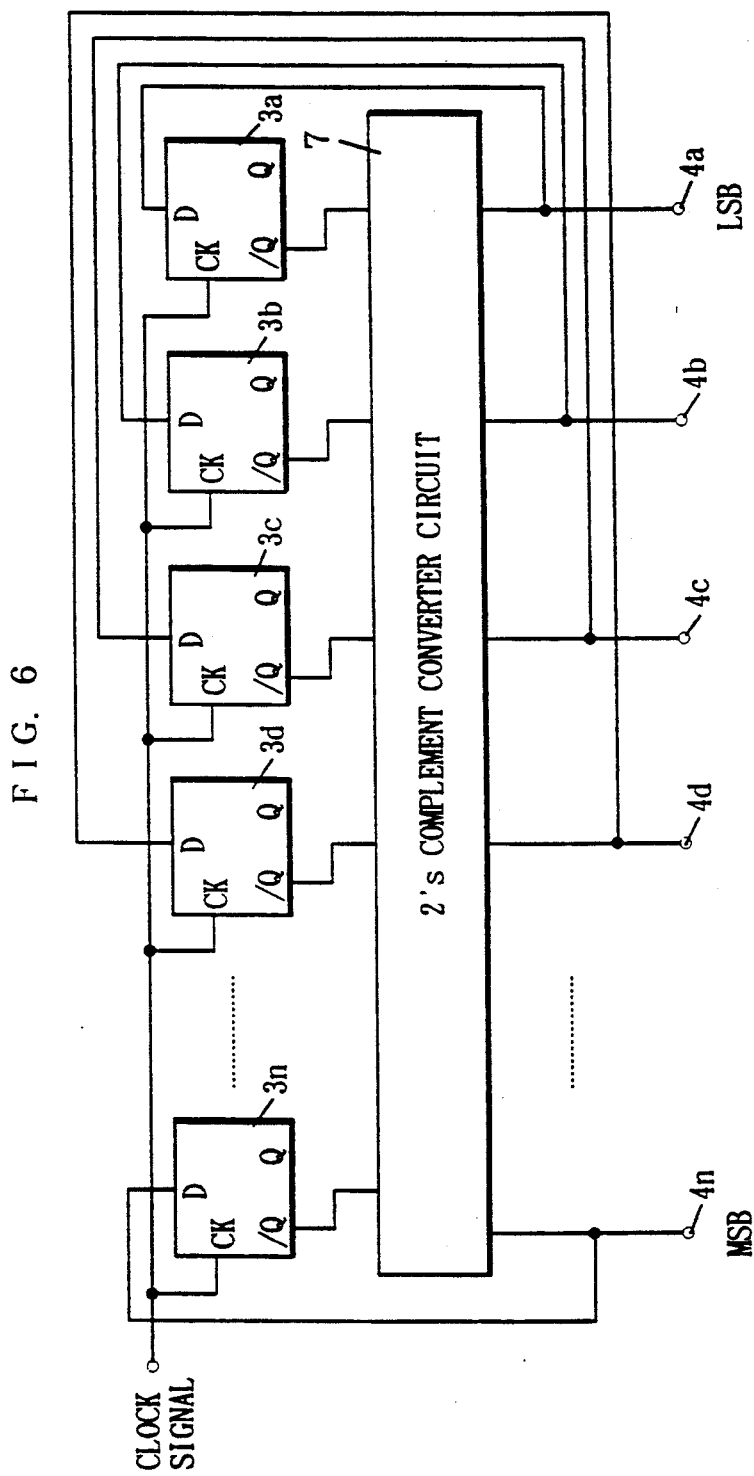
FIG. 6 is a block diagram showing a structure of an up counter in accordance with one embodiment of the present invention.

FIG. 6 is a block diagram showing a structure of an up counter in accordance with one embodiment of the present invention. The flipflops 3a to 3n store logic value of each bit to be counted up. Each of the flipflops 3a to 3n outputs inverted data of the stored data, that is, binary data after 1's complement conversion, from each/Q output terminal. The binary data which has been subjected to 1's complement conversion is applied to the 2's complement converting circuit 7 to be converted to 2's complement. The 2's complement converting circuit 7 has, for example, a structure such as shown in FIG. 2. An output from the 2's complemented converting circuit 7 is applied to output terminals 4a to 4n as well as to data input terminals D of the flipflops 3a to 3n. Therefore, in the up counter of the embodiment shown in FIG. 6, the binary data stored in the flipflops 3a to 3n are converted to 1's complement to be output, then converted to 2's complement in the 2's complement converting circuit 7 to be output from the output terminals 4a to 4n, and rewritten to the flipflops 3a to 3n. Therefore, binary data output from the output terminals 4a to 4n are each incremented by +1 every time the clock signal CK is input to the flipflops 3a to 3n. The data of the result of counting may be provided from the Q output terminals of flip flops 3a to 3n.

Figure 7:
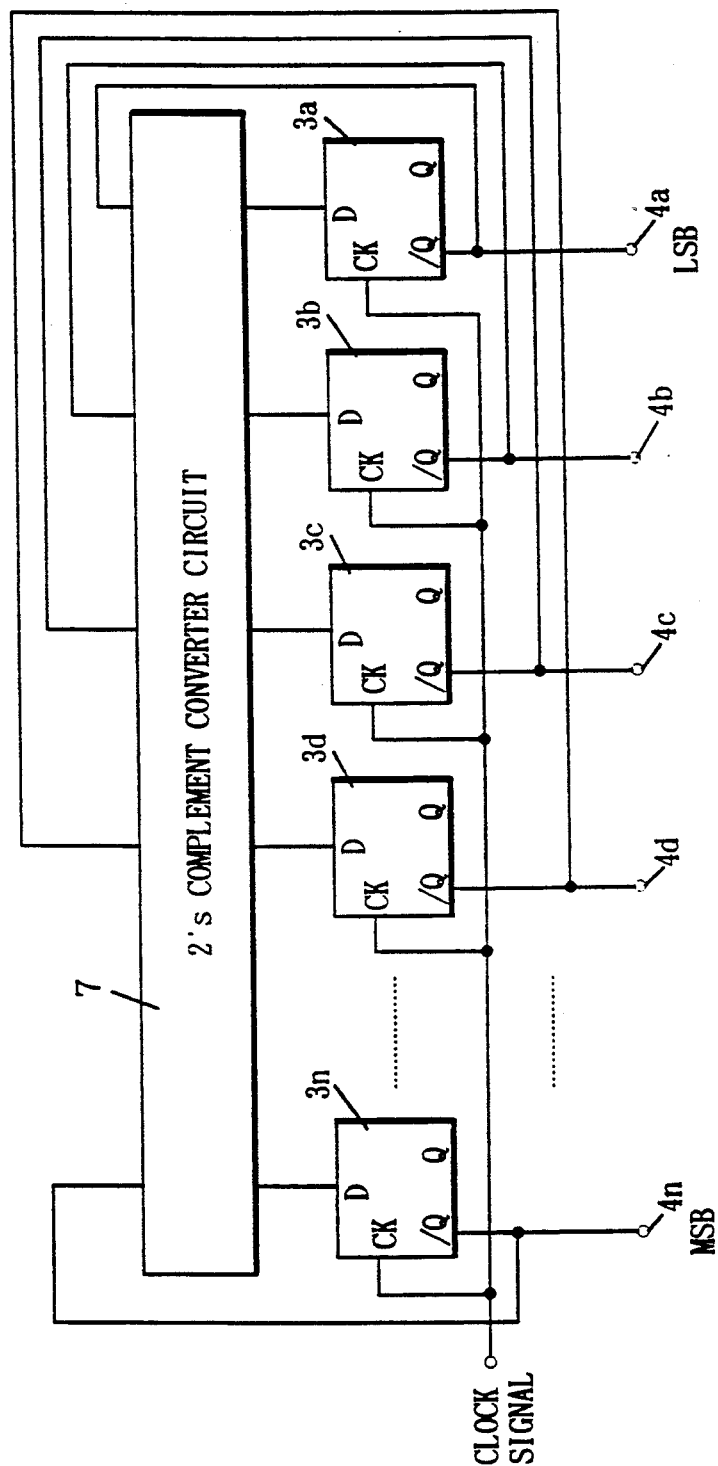
FIG. 7 is a block diagram showing a structure of a down counter in accordance with one embodiment of the present invention.

FIG. 7 is a block diagram showing a structure of a down counter in accordance with one embodiment of the present invention. Referring to the figure, the down counter comprises flipflops 3a to 3n and a 2's complement converting circuit 7. Binary data output from /Q output terminal of each flipflop is converted to 2's complement in the 2's complement converting circuit 7, and then rewritten in the flipflops 3a to 3n. The binary data stored in the flipflops 3a to 3n are output as the binary data converted to 1's complement from /Q output terminals. Therefore, the binary data output from the output terminals 4a to 4n are each decremented by 1 (−1) every time the clock signal CK is input to the flipflops 3a to 3n.

According to the invention, as described hereinabove, the up-counting and down-counting can be achieved on the principle which is quite different from those in the conventional updown counters, so that the circuit structures can be very simple. Therefore, it is possible to provide the inexpensive binary counter in which required element number of the transistors is small and a circuit area is also small.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A binary counter for up-counting and down-counting binary data, comprises:
   memory means for storing binary data to be counted;
   up-count means for up-counting said binary data stored in said memory means by converting the same into a complement on two after converting the same to a complement on one;
   down-count means for down-counting said binary data stored in said memory means by converting the same into a complement on one after converting the same to a complement on two; and
   control means for selectively activating said up-count means in an up-count mode and activating said down-count means in a down-count mode; wherein said data stored in said memory means is rewritten, depending on a count result of said up-count means or said down-count means activated by said control means.

2. A binary counter according to claim 1, wherein said up-count means includes;
- first 1's complement converter means for converting said binary data stored in said memory means into the complement on one, and
- first 2's complement converter means for converting binary data output from said first 1's complement converter means into the complement on two; and said down-count means includes;
- second 2's complement converter means for converting binary data stored in said memory means into the complement on two, and
- second 1's complement converter means for converting binary data output from said second 2's complement converter means into the complement on one.

3. A binary counter according to claim 2, wherein said control means includes;
- first selector means for selecting an output from said first 1's complement converter means to apply the same to said first 2's complement converter means in the up-count mode, and for applying said binary data read from said memory means to said second 2's complement converter means in the down-count mode; and
- second selector means for selecting an output from said first 2's complement converter means to apply the same to said memory means in the up-count mode, and for selecting an output from said second 1's complement converter means to apply the same to said memory means in the down-count mode.

4. A binary counter according to claim 3, wherein said first 2's complement converter means is usable as said second 2's complement converter means in the down-count mode.

5. A binary counter according to claim 3, wherein said first 1's complement converter means includes an inversion output terminal through which said binary data stored in said memory means is outputted after being inverted.

6. A binary counter according to claim 3, wherein said second 1's complement converter means includes inverter means for inverting an output from said second 2's complement converter means.

7. A binary counter according to claim 2, wherein said first and second 2's complement converter means include;
- first circuit means provided for a least significant bit signal of applied binary data; and
- a plurality of second circuit means provided for bit signals other than the least significant bit of the applied binary data;
- said first circuit means includes means for outputting said least significant bit signal as it is; and
- said second circuit means includes inverted/non-inverted signal output means for selectively outputting an inverted signal or a non-inverted signal of bit signal in question depending on logical states of the respective bits signals less significant than the corresponding bit signal.

8. A binary counter according to claim 7, wherein said inverted/non-inverted signal output means includes;
- logical operation means for effecting a logical operation of respective bit signals less significant than a corresponding applied bit signal; and
- switching means for selectively outputting an inverted signal or a non-inverted signal of the corresponding bit signal, depending on the output from said logical operation means.

9. A binary counter according to claim 8, wherein said logical operation means is an OR circuit for effecting a logical sum operation.

10. A binary counter according to claim 9, wherein said switching means is an exclusive OR circuit.

11. A binary counter according to claim 10, wherein said control means includes;
- first selector means for selecting an output from said first 1's complement converter means to apply the same to said first 2's complement converter means in the up-count mode, and for applying the binary data read from said memory means to said second 2's complement converter means in the down-count mode; and
- second selector means for selecting an output from said first 2's complement converter means to apply the same to said memory means in the up-count mode, and for selecting an output from said second 1's complement converter means to apply the same to said memory means in the down-count mode.

12. A binary counter according to claim 11, wherein said first 2's complement converter means is usable as said second 2's complement converter means in the down-count mode.

13. A binary counter according to claim 11, wherein said first 1's complement converter means includes an inversion output terminal through which binary data stored in said memory means is outputted after being inverted.

14. A binary counter according to claim 11, wherein said second 1's complement converter means includes inverter means for inverting an output from said second 2's complement converter means.

15. A method for up counting or down counting binary data stored in memory means, comprising the steps of:
- converting the binary data stored in said memory means to a complement on one and then converting the same to a complement on two for rewriting stored content in said memory means by the converted data in an up-count mode; and converting the binary data stored in said memory means to a complement on two and then converting the same to a complement on one for rewriting stored content in said memory means by the converted data in a down-count mode.

16. A binary counter for up counting binary data, comprising:
- memory mean for storing binary data to be up-counted;
- 1's complement converting means for converting binary data stored in said memory means to 1's complement; and
- 2's complement converting means for converting output from said 1's complement converting means to 2's complement; wherein
- the data stored in said memory means is rewritten by an output from said 2's complement converting means.

17. A binary counter for down counting binary data, comprising:

memory means for storing binary data to be down-counted;

2's complement converting means for converting binary data stored in said memory means to 2's complement; and 1's complement converting means for converting an output from said 2's complement converting means to 1's complement; wherein stored data in said memory means is rewritten by an output from said 1's complement converting means.

18. A binary counter selectively incrementing and decrementing binary weighted data represented by a plurality of binary bits ranked from least to most significant, said counter comprising;

memory means for storing said binary data;

1's complement converting means for performing a 1's complement conversion of binary data supplied at input terminals thereof and providing said 1's complemented binary data at respective output terminals thereof;

2's complement converting means for performing a 2's complement conversion of binary data supplied at input terminal thereof and providing said 2's complemented binary data at respective output terminals thereof;

control means for selectively (i) applying binary data stored in said memory to said input terminals of said 1's complement converting means, providing said 1's complemented binary data from said output terminals of said 1's complement converting means to said input terminals of said 2's complement converting means, and storing said 2's complemented binary data supplied at said output terminals of said 2's complement converting means in said memory means whereby said binary data is incremented, and (ii) applying binary data stored in said memory to said input terminals of said 2's complement converting means, providing said 2's complemented binary data from said output of said 2's complement converting means to said input terminals of said 1's complement converting means, and storing said 1's complemented binary data in said memory means whereby said binary data is decremented.

19. The binary counter according to claim 18, wherein said 1's complement converting means comprises a plurality of inverters corresponding to a number of bits of said binary data.

20. The binary counter according to claim 18, wherein said 2's complement converting means comprises;

a number of input terminals equal to a number of bits of said binary data and ordered from least to most significant bit positions;

a number of output terminals equal to said number of bits of said binary data and ordered from least to most significant bit positions;

a number of inverting means equal to one less than said number of bits of said binary data for selectively inverting respective bit signals applied thereto in response to respective control signals, said inverting means having respective input terminals connected to most significant ones of said 2's complement converting means input terminals and respective outputs connected to most significant ones of said 2's complement converting means;

non-inverting connection means for supplying a bit signal applied to the least significant bit input terminal to the least significant bit output terminal of said 2's complement converting means;

a number of logic means equal to one less than said number of bits of said binary data and ordered in correspondence with respective ones of said inverting means for providing respective control signals thereto, each of said logic means receiving bit signals from each of said input terminals of said 2's complement converting means of lower order than an order the respective logic means and providing an output responsive to a first logic level of any of the bit signal on any of said lower order input terminals.

21. The binary counter according to claim 18, wherein said 2's complement converting means comprises:

N input terminals equal to a number of bits of said binary data and ordered from 1 to N corresponding to least to most significant bit positions, respectively;

N output terminals ordered from 1 to N corresponding to least to most significant bit positions, respectively;

N−1 inverting means ordered from 2 through N responsive to respective control signals for selectively inverting respective bit signals applied to input terminals 2 through N and providing said selectively inverted bit signals to respective ones of said output terminals 2 through N;

non-inverting connection means for supplying a bit signal applied to input terminal 1 to output terminal 1; and N−1 OR logic means ordered from 2 through N, each ith of said logic means having i−1 inputs connected to respective input terminals 1 through i−1 and providing a logical OR signal of said 1 through i−1 inputs as a control signal to said ith inverting means.

22. A method of selectively incrementing and decrementing binary weighted data stored in a register in the form of a plurality of data bits comprising the steps of:

complementing on one the contents of said register and subsequently complementing on two the 1's complemented contents of said register in response to an increment signal; and complementing on two the contents of said register and subsequent complementing on one the 2's complemented contents of said register in response to a decrement signal.

23. A binary counter for up counting by 1 binary data including a plurality of bits, in response to a clock signal, comprising:

register means having a plurality of memory bits corresponding to the respective bits of said binary data, for temporarily storing and outputting logic values of corresponding bits of said binary data to each memory bit; and converting means having a plurality of converting bits corresponding to respective memory bits of said register means, for converting an output from the corresponding memory bit to a prescribed logic value in each converting bit to output the result to the corresponding memory bit; wherein a least significant converting bit of said converting means inverts an output applied from the corresponding memory bit of said register means and outputs the result to the corresponding memory bit to change the stored logic value, and each of the converting bits other than the least significant bit in said converting means outputs to the corresponding memory bit, wherein at least one of the stored logic values in less significant memory bits has a first logic value, the output from the corresponding converting bit to the corresponding memory bit maintains the stored logic value, and wherein all of the stored logic values in the less significant memory bits have a second logic value, the output from the corresponding converting bit to the corresponding memory bit changes the stored logic value.

24. A binary counter for down counting, by 1, binary data including a plurality of bits in response to a clock signal, comprising:

register means having a plurality of memory bits corresponding to respective bits of said binary data, for temporarily storing and outputting logic values of corresponding bits of said binary data to each memory bit; and converting means having a plurality of converting bits corresponding to respective memory bits of said register means, for converting an output from the corresponding memory bit to a prescribed logic value in each converting bit to output the result to the corresponding memory bit; wherein a least significant converting bit of said converting means inverts an output applied from the corresponding memory bit of said register means and outputs the result to the corresponding memory bit to change the stored logic value, and each of the converting bits other than the least significant bit in said converting means outputs to the corresponding memory bit, wherein all of the stored logic values in less significant memory bits have a first logic value, the output from the corresponding converting bit to the corresponding memory bit changes the stored logic value, and wherein at least one of the stored logic values in the less significant memory bits has a second logic value, the output of the corresponding converting bit to the corresponding memory bit maintains the stored logic value.

25. A binary counter for up counting or down counting by 1, binary data including a plurality of bits in response to a clock signal, comprising:

register means having a plurality of memory bits corresponding to respective bits of said binary data, for temporarily storing in each memory bit, logic value of the corresponding bit of said binary data to output the same;

least significant bit inverting means provided corresponding to the least significant memory bit of said register means for inverting output of the least significant memory bit and for outputting the result to the least significant memory bit to change stored content thereof;

a plurality of inverting means corresponding to the memory bits other than the least significant bit of said register means, each having an input node and an output node, for inverting a signal input to the input node to output the result of inversion to the output node;

a plurality of converting means provided corresponding to the memory bits other than the least significant bit of said register, each having an input node, an output node and a control node, responsive to a signal received at the control node, outputting a signal input to the input node as it is or by inverting the signal, to the output node; and selecting means connecting, when a control signal indicative of up counting is received, the input node of each of said inverting means to the output of the corresponding memory bit of said register means, connecting the output node of each of the inverting means to the corresponding input node of said converting means, and connecting the output node of each converting means to the input of the corresponding memory bit, and when a control signal indicative of down counting is received, connecting the input node of each converting means to the output of the corresponding memory bit, connecting the output node of each converting means to the input node of the corresponding inverting means, and connecting the output node of each inverting means to the input of the corresponding memory bit.

* * * * *